United States Patent [19]

Hubbard

[11] Patent Number: 4,843,881
[45] Date of Patent: Jul. 4, 1989

[54] FLUID FLOW SENSOR SYSTEM
[75] Inventor: Arthur C. Hubbard, Arlington, Va.
[73] Assignee: Aalborg Instruments & Controls, Monsey, N.Y.
[21] Appl. No.: 137,955
[22] Filed: Dec. 24, 1987
[51] Int. Cl.⁴ ............................................. G01F 1/68
[52] U.S. Cl. ........................... 73/204.16; 73/204.15
[58] Field of Search ................ 73/204, 204.13, 204.16

[56] References Cited

U.S. PATENT DOCUMENTS

| | | | |
|---|---|---|---|
| 3,683,692 | 8/1979 | Lafitte | 73/204 |
| 3,931,736 | 1/1976 | Olmstead | 73/204 |
| 3,942,378 | 3/1976 | Olmstead | 73/204 |
| 4,083,244 | 4/1978 | Agar et al. | 73/204 |

FOREIGN PATENT DOCUMENTS 0128123  6/1986  Japan ..................... 73/204

*Primary Examiner*—Herbert Goldstein
*Attorney, Agent, or Firm*—Philip Furgang

[57] ABSTRACT

A mass flow sensing system in which two heating/sensing coils are disposed about a conduit through which the fluid passes, the coils being located up and down stream along the conduit and close proximity to one another. Each coil forms one leg of a bridge circuit. Each bridge circuit has a regulator amplifier circuit. One input of the amplifier is coupled to one side of the bridge coil which is joined to a first fixed resistor. The other side is coupled to the juncture of the other two of the fixed resistor. The output of the amplifier is fed back to the juncture of the first and second fixed resistor. The fluid is heated to well above its ambient temperature as it enters the conduit. Changes in current necessary to maintain the heater/sensor coils at a constant operating temperature are sensed by a differential amplifier connected to the juncture of the first and second fixed resistors of each bridge.

6 Claims, 1 Drawing Sheet

FLUID FLOW SENSOR SYSTEM

This invention relates to fluid flow sensing systems and, more particularly, to an improved device for determining the flow rate as a function of the heat absorbed by sensing means in bridge circuit with the sensing means disposed proximate to the flow path of the fluid

DESCRIPTION OF THE PRIOR ART

It is well known to sense the mass flow rate of a fluid through a conduit by measuring the heat transfer of the fluid to temperature sensitive elements. The temperature sensitive elements convert temperature changes into an electrically equivalent parameter. This parameter may, for example, be the change in conductivity of the sensing element.

Typically, the fluid is heated to a predetermined operating temperature. One or more of the sensing devices are disposed either within the fluid flow path or immediately adjacent to it. The sensing element is incorporated into a bridge device and the unbalancing of the bridge is used as an indication of the flow rate.

In the prior art it is known to pass a fluid through a conduit and heat the fluid. Sensors, which may be part of a bridge circuit, are located upstream and downstream of the heater. Any temperature difference between the sensors, when accounting for the heat supplied by the heater, gives an indication of mass flow rate. Such devices are disclosed by Werner et al. in U.S. Pat. No. 3,433,068 and by Olin in U.S. Pat. No. 4,487,062. The latter patent discloses a single bridge with the upstream and downstream heating coils about the conduit and forming legs of the bridge circuit. Flow is then measured as a function of the difference in the temperature of the legs. The disadvantage of this system is that there is a temperature gradient along the conduit which effects the sensor readings with the fluid flow. It may take 50 to 100 secons for the temperature to stabilize at a new flow rate. It is known to provide compensation circuits to counteract this long response time. Such compensation circuits can reduce the response time to 2 seconds. Among the disadvantge of such devices are the added cost and complexity of such circuits and the necessity of calibrating each circuit to account for inherent differences in the parameters between production units. Thus, a disadvantage of this system is the long time to stabilize of from approximately 10 to 100 seconds.

Another approach is to measure the power required to maintain the constant temperature of the heater as the fluid passes through the conduit it heats. A disadvantage of this system is that it also requires a long time to stabilize of from approximately 0.2 to 2.0 seconds.

In both devices, a disadvantage is that they are non-linear because the basis of measurement is the rate of energy flow.

Yet another flow rate measurement device is disclosed by Grunwald in U.S. Pat. No. 4,527,427 and Handermann in U.S. Pat. No. 4,587,842. In Grunwald and Handermann, two heat sensitive resistors are placed directly in the flow path of a fluid. Each heat sensitive resistor is incorporated in an arm of a bridge circuit. The heat sensitive resistors are each heated to different temperatures. The flow rate of this fluid is determined by comparing the heat losses from each heat sensitive resistor. If the temperature of each resistor is maintained at the same temperature, there is no indication of flow rate. These systems can only indicate flow rate but cannot indicate flow direction. To overcome this deficiency, the Handermann device cants the heat sensitive resistor at an angle to the flow rate. Yet another deficiency in these devices is that the heat sensitive resistors are disposed directly in the flow path of the fluid. This means that the sensing elements disrupt the flow path and, as a consequence, the flow rate. Still another defect is that the heating of the fluid can only take place proximate the heating sensing elements. This means that the effective rate between the two elements is unlikely to be accurate.

Another device is disclosed by Moore in U.S. Pat. No. 3,597,676. This device disposes heat sensitive elements, in this case thermistors, in a conduit. The device cannot measure flow rate. Rather, the thermistors are disposed diametrically across the flow path so that any rotation about an axis perpendicular to the fluid flow is registered. As in the Grunwald and Handermann devices, the imposition of the heat sensing elements in the flow path distorts the flow and could not give an indication of flow rate.

Yet another device is disclosed by Ewing et al. in U.S. Pat. No. 4,464,932. In that device, heating coils are provided upstream and downstream, on either side of a sensing coil. The sensing coil forms one leg of a bridge. The sensing coil displays the nonlinearity imposed by the square root dependence upon the mass flow rate.

SUMMARY OF THE INVENTION

It is, therefore, an object of this invention to provide a new and improved fluid mass flow sensing system.

Another object of this invention is provide a fluid mass flow sensing system which has greater linearity than has heretofore been demonstrated.

It is yet another object of this invention to provide a fluid flow sensing system which reaches stable reading states in faster time than has been previously known.

In accordance with this invention there is provided a fluid flow sensing system for measuring the mass flow of a fluid having a temperature within a predetermined ambient range The system comprises conduit means for receiving the fluid within the predetermined ambient range. It has at least two heating means which are exterior to the conduit for heating the fluid to at least one predetermined operating temperature. There is also provided two bridge circuits. Each of the heating means are coupled to a respective one of the bride circuits. Regulation means are coupled to the bridges. The regulation means maintains the fluid substantially at the predetermined operating temperature. The predetermined operating temperature is well in excess of the ambient temperature range of the fluid entering said conduit means. Means are also provided for measuring the difference in currents necessary to maintain the predetermined operating temperature of the fluid to thereby determine the flow rate of the fluid.

DESCRIPTION OF THE PREFERRED EMBODIMENTS

Figure 1:
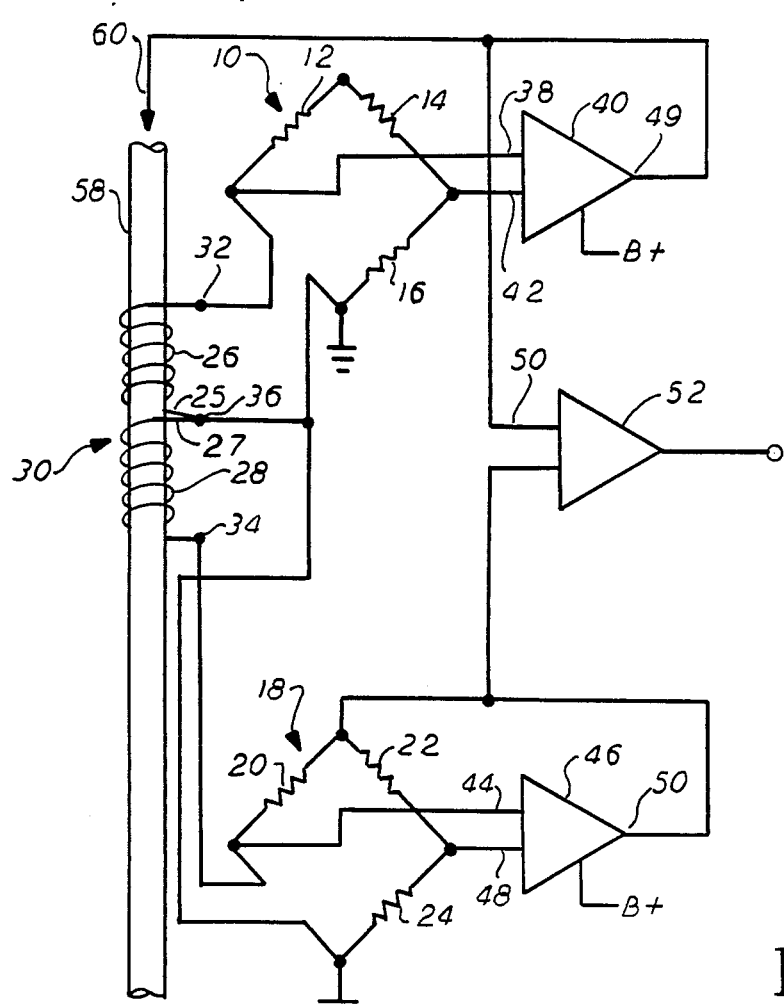
FIG. 1 is a schematic of the device of this invention.

Turning to the drawing, in FIG. 1, there is provided a circuit for measuring the mass flow rate of the fluid. A first bridge circuit 10 may comprise three resistors 12, 14, and 16 connected to one another, as is well known in the art. The resistors 12, 14, and 16 may be of predetermined values. A second bridge circuit 18, likewise may comprises three resistors 20, 22, and 24 which are connected to one another as is well known in the prior art. These resistors 20, 22, and 24, may be of predetermined values and the same equivalent values as the first bridge resistors 12, 14, and 16. Thus, resistors 12 and 20 may be 50 ohms; 14, 16, 22, and 24 may be each 10K ohms.

The fourth leg 26 of the first bridge 10 and the fourth leg 28 of the second bridge 18 may be, for example, coils 26 and 28, respectively. The coils 26 and 28 may be of any material having a high coefficient of resistivity as a function of temperature such as pure nickel or platinum. It is important that each coil be located in proximity to one another. One end 32 of the coil 26 may be connected to the first resistor 12 of the first bridge 10. The other end 34 of the coil 28 may be connected to the first resistor 18 of the second bridge 18. The other ends 25 and 27 of the coils 26 and 28 may be connected to the third resistor 16 of the first bridge 10 and the third resistor 24 of the second bridge 18.

One of the dual inputs 38 of a first regulator 40, as is well known in the art, may be connected to the juncture 32 of the fourth leg 26 and the first resistor 12 of the first bridge 10. The other input 42 of the first regulator 40 may be joined to the juncture of the second and third resistors 14 and 16 of the first bridge 10. Power, in the form of B+, is provided to the first regulator 40, as is well known in the art.

In a like manner, one of the dual inputs 44 of a second regulator 46, as is well known in the art, may be connected to the juncture 34 of the fourth leg 28 and the first resistor 20 of the second bridge 18. The other input 48 of the second regulator 46 may be joined to the juncture of the second and third resistors 22 and 24 of the second bridge 18. Power, in the form of B+, is provided to the second regulator 46, as is well known in the art.

The output 49 of the first regulator 40 may be coupled to the juncture of the first and second resistors 12 and 14 of the first bridge. The output 50 of the second regulator 46 may be coupled to the juncture of the first and second resistors 20 and 22 of the second bridge 18. The respective outputs 49 and 50 may be also coupled to the dual input of an amplifier 52. The center tap 36 connected to resistors 16 and 24 are tied to ground.

Each regulator 40 and 46 may comprise an amplifier 54 coupled to a transistor 56 (FIG. 2) as is well known in the art. The coils 26 and 28 may be heated by the current supplied by the regulators 40 and 46. The coils 26 and 28 may be wrapped about the exterior of a conduit 58. The fluid, which may, for example, be a gas, passes from the up stream end (arrow 60) through the down stream end (arrow 62) of the conduit 58.

An alternate embodiment (FIG. 2) is disclosed in which similar elements functioning in the same way are identified with the same numbers as in FIG. 1. As in the previous embodiment, two bridge circuits 10 and 18 have one leg comprised of a sensing coil. The 26' and 28' ends 25' and 27' of the coils 26' and 28' are coupled to ground. One end 32' of the coil 26' is connected to the first resistor 12 of the first bridge 10. The other end 34' of the coil 28' is connected to the first resistor 20 of the second bridge 18. Inputs 38 and 44 of first and second regulators 40 and 46 are connected respectively to the juncture 32' of the coil 26' and the first resistor 12 of the first bridge 10 and the juncture 34' of the coil 28' and the first resistor 20' of the second bridge 18. The second inputs 42 and 48 of the first and second regulators 40 and 46 are respectively connected to the juncture of the second and third resistors 14 and 16 of the first bridge 10 and the second and third resistors 22 and 24 of the second bridge 18. The second embodiment differs from the first in that the heater coils are separated from the sensing coils 26' and 28'. Thus, there may be two heater coils 62 and 64. The first heater coil 62 may have one end 66 coupled to the output 49' of the first regulator 40. The second heater coil 64 may have one end 68 connected to the output 50' of the second regulator 46. The other end of each heater coil 62 and 64 may be coupled to ground. The first heater coil 63 may be disposed about the conduit 58 upstream of the sensing coil 26'. The second heater coil 64 may be disposed about the conduit 58 downstream of the sensing coil 28'.

In operation, the regulators 40 and 46 heat the coils 30, 63, 64 to an operation temperature well in excess of the ambient temperature of the fluid that is to be measured. Thus, for example, if the fluid is a gas at 20° C., the heater coils 30, 63, 64 raise the temperature to, for example 220° C. When the gas flows through the conduit 58, the transfer of heat energy has a tendency to cool the upstream coil 26 and 26' and heat the downstream coil 28 and 28'. The regulators 40 and 46 tend to counteract this tendency and maintain zero temperature gradient between the coils 26 and 28 or 26' and 28'. Increased electrical power is required at the upstream heater 26 or 63 under conditions of fluid flow. At the same time, the electrical power required at the downstream coils 28 and 64 is reduced while the temperature is maintained constant. Indication of the flow rate is measured by reading the difference in voltages at the two heaters 26 and 28 or 63 and 64. As the regulators 40 and 46 attempt to keep the temperature the same, the voltage across the heater coils 26 and 28, 63 and 64 must change to meet the changing heat demands imposed by the flow changes. It is this voltage which indicates the flow rate.

This system differs from the prior art systems in that the fluid is heated by the heater coil 26, 28 above its ambient temperature. The flowing gas creates a temperature gradient along the length of each coil 26, 28. Each bridge 10, 18 is sensitive to the average temperature because each bridge responds to the respective resistance of the entire coil 26 or 28. In the case of zero flow rate, the coils 26, 28 require the identical amount of electrical power to maintain each bridge at the same operating temperature. When gas flow commences, additional electrical power is required to maintain the same operating temperature. The downstream coil, because it now absorbs heat from the flowing gas, requires less electrical power to maintain the same operating temperature. It is this difference of temperature that indicates the flow rate.

Figure 2:
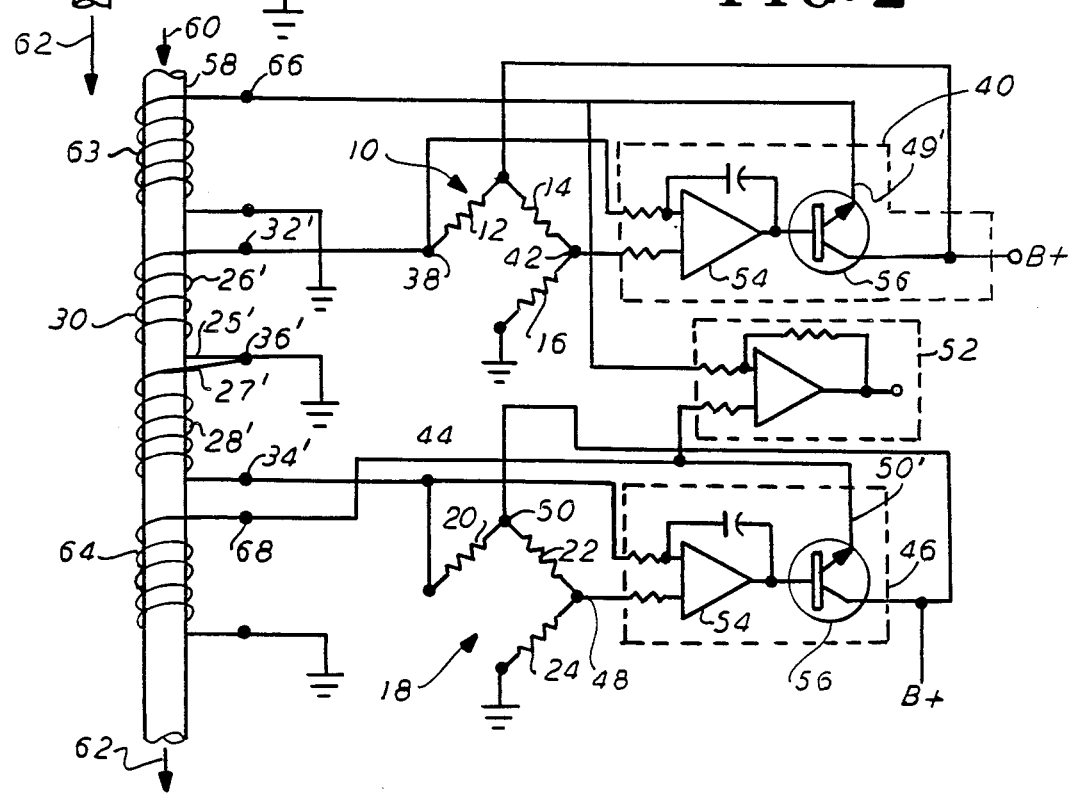
FIG. 2 is another schematic of the device of this invention.

FIG. 2 shows a separation of the temperature sensing and heating functions. This permits separate optimization of coil design for only sensing or only heating functions. The fact that the exterior of the tube is heated means that the entire fluid sample is heated rather than a small part. The sensors are removed from the flow path and therefore do not disturb or distort the mass flow rate. In the preferred embodiment the tube or conduit is made of metal and the coils are made of platinum, nickel, or the like. Further, it is direction sensitive in that it will indicate flow rate in either direction but the polarity of the signal will indicate direction.

It has been observed that the response time of this system to flow rate measurement (i.e., the time necessary for the system to become stable and give an accurate indication of flow rate) is, by comparison with prior art devices, very fast and extremely linear. The effect of a system crash, where the flow rate exceeds the capacity of the system to indicate it, is extremely high.

It has also been observed that the system stabilizes in less than 0.2 of a second, demonstrating improved response time.

The maintenance of a fixed distribution of temperatures along the length of the conduit to a first approximation avoids long time lags as is seen in prior art devices that do not regulate the temperature. This results in a high speed of response to changes in flow rate of approximately 1.5 seconds. With a compensation circuit, well known in the art, response time is reduced to 0.2 seconds.

It is clear that each sensing coil is subject to nonlinearity imposed by the square root dependence upon the mass flow rate. However, because the upstream coil measures the square root of a large, fixed quantity plus a smaller quantity, which is a function of the mass flow rate, and the downstream coil measures the square root of the same large fixed quantity minus a smaller quantity, which is a function of the mass flow rate, it can be shown, by taking the difference between the two square roots that there is a significant improved linearity over the prior art devices by an order of magnitude.

Thus:

$$W_U = W_C + W_F$$

$$W_D = W_C - W_F$$

Where:

$W_U$ = electrical power delivered by the regulator circuit to the upstream coil;

$W_D$ = electrical power delivered by the regulator circuit to the downstream coil;

$W_C$ = heat conducted away from the coil to the frame or base (not shown) of the instrument;

$W_F$ = heat absorbed by the flowing fluid at the upstream coil and delivered by the fluid to the downstream coil.

Then:

$$V_u = (k\sqrt{W_C})\sqrt{1 + W_F/W_C}$$

$$V_D = (k\sqrt{W_C})\sqrt{1 - W_F/W_C}$$

Where $V_U + V_D$ are the voltages observed in the circuit, at up and downstream coils.

$k\sqrt{W_C}$ is a constant of proportionality

Now:

$$V_u - V_D = (k\sqrt{W_C})\{\sqrt{(1+x)} - \sqrt{(1-x)}\}$$

Where x is substituted for $W_F/W_C$ $\sqrt{1+x}$ and $\sqrt{1-X}$ may be expanded in Taylor's series:

$(1+x)$ to the exponent $(\frac{1}{2}) = 1 + \frac{1}{2}x + \frac{1}{8}x^2 + 1/48x^3 + \cdots$ $(1-x)$ to the exponent $(\frac{1}{2}) = 1 - \frac{1}{2}x + \frac{1}{8}x^2 - 1/48x^3 + \cdots$ Compare the indicator voltage for the case of a single sensor in which:

$$V = k\sqrt{W_C}(1 + \frac{1}{2}x + \frac{1}{8}x^2 + 1/48x^3 + \cdots)$$

The two coil system of this invention cancels the largest factor contributing to the nonlinearity of the single coil system, namely the term including $x^2$. This represents an advantage of one order of magnitude in linearity for the two coil system when compared to the single coil system Another significant advantage of this device over the prior art is that the system is unaffected by variations in the ambient temperature of the fluid. The two sensor coils are equally effected by variations in the ambient temperature. The differential amplifier that measures the difference of $V_u$ and $V_D$ has the effect of cancelling these ambient variations. This is otherwise known as the "common mode" effect.

It has also been observed that the system stabilizes in less than 0.2 of a second, thereby providing improved response time.

It is understood that although there is shown the preferred form of the invention that various modifications may be made in the details thereof without departing from the spirit as comprehended by the following claims.

What is claimed is:

1. A fluid flow sensing system for measuring the mass flow of a fluid having a temperature within a predetermined ambient range comprising:
    (a) conduit means for receiving the fluid within the predetermined ambient temperature range;
    (b) at least first and second heating means exterior to said conduit for heating the fluid to at least one predetermined operating temperature;
    (c) two bridge circuits;
    (d) each of said heating means coupled to a respective one of said bridge circuits;
    (e) regulation means coupled to said bridges for maintaining the fluid substantially at the predetermined operating temperature; said predetermined operating temperature being well in excess of the ambient temperature of the fluid entering said conduit means;
    (f) means for measuring the difference in currents necessary to maintain said predetermined operating temperature of the fluid to thereby determine the flow rate of the fluid;
    (g) at least two sensing means, each coupled to said conduit and to one of said bridges to sense any change of temperature of the fluid; said first and second heating means being disposed up and down stream with said two sensing means there between; said regulation means being responsive to said sensing means to thereby increase or decrease the flow of current to selective one of said heating means to thereby maintain said predetermined operating temperature.

2. A fluid flow sensing system as recited in claim 1 wherein said sensing means each comprise a coil of wire about said conduit; each of said coils comprising one of said sensing means; each of said coils forming one leg of each of said bridges.

3. A fluid flow sensing system as recited in claim 2 wherein said heating means comprises a coil of wire upstream and down stream of said sensing coils to thereby heat the fluid flowing in said conduit.

4. A fluid flow sensing system as recited in claim 3 wherein said regulator means comprises at least two dual input differential amplifier circuits; each amplifier being coupled across one of said bridges, one input of each of said amplifiers being coupled to the juncture of one fixed resistor with said sensing coil and the other of said inputs being coupled to the juncture of the second and third fixed resistors; the output of each of each of said regulator means being coupled to one of said heating coil such that any sensed change of said predetermined operating temperature by a sensing coil results in said regulator means coupled to said sending coil providing an increase or decrease in current flow to said heating coil to thereby substantially maintain said predetermined operating temperature; one side of said heating coils and said sensing coils and said third resistor of each bridge being coupled to ground.

5. A fluid flow sensing system as recited in claim 4 wherein said measuring means comprises a dual input differential amplifier having one input coupled to the juncture of said first and second resistors of each of said bridges to thereby detect and amplify the difference in current flow necessary to maintain said predetermined operating temperatures to thereby give an indication of flow rate.

6. A fluid flow sensing system as recited in claim 1 wherein said first heating means heats said fluid to a first predetermined operating temperature and said second heating means heats said fluid to a second predetermined operating temperature; said predetermined operating temperatures being in excess of the temperature entering said conduit.

* * * * *